(12) United States Patent
Nevak (10) Patent No.: US 6,834,953 B1
(45) Date of Patent: Dec. 28, 2004

(54) EMERGENCY EYEGLASS NOSE PAD ARM REPAIR DEVICE

(76) Inventor: Christopher Nevak, P.O. Box 207, Bethel, AK (US) 99559

(*) Notice: Subject to any disclaimer, the term of this patent is extended or adjusted under 35 U.S.C. 154(b) by 0 days.

(21) Appl. No.: 10/769,526

(22) Filed: Jan. 30, 2004

(51) Int. Cl.[7] .................................................. G02C 5/12
(52) U.S. Cl. ........................ 351/136; 351/80; 351/138; 351/42
(58) Field of Search ................................ 351/136–139, 351/42, 76–81

(56) References Cited

U.S. PATENT DOCUMENTS 5,581,312 A * 12/1996 Chen ........................... 351/138
6,364,480 B1 * 4/2002 Chen ........................... 351/138

* cited by examiner

Primary Examiner—Huy Mai
(74) Attorney, Agent, or Firm—Michael J. Tavella (57) ABSTRACT

A portable replacement for eyeglass nose pads and arm posts. The invention is a pair of tubes, made of flexible plastic tubing. The tubing can be padded for additional comfort. The padding can also be contoured to better fit against a user's nose. The tubing is designed to fit over the posts that remain after the nose pad is broken off, or they can be placed directly on the lens if the post is broken too. The tubes are friction fit over the lens or posts. Once the tubes are in place, the user may wear the eyeglasses until they can be brought to a repair shop. The tubes can be cut to any desired length as needed. Moreover, several diameters of tubing can be provided to ensure a proper fit on any given lens or set of posts.

16 Claims, 8 Drawing Sheets

EMERGENCY EYEGLASS NOSE PAD ARM REPAIR DEVICE

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates eyeglass repair devices and particularly to eyeglass nose pad repair devices.

2. Description of the Prior Art

Eyeglasses have soft nose pads that support the glasses off the nose. These pads are symmetrical and are designed to balance the glasses on the wearer. Typically, nose pads have a pair of metal rods that extends down and out from the frame. These rods are then covered by a soft material, usually plastic, to protect the wearer's nose. These pads, and even he rods themselves, break or fall off the glasses periodically. This presents a problem in that not only are the glasses unbalanced; the lack of soft pads produces discomfort for the wearer. Often, the user has access to a spare pair of glasses that can be used until the original pair can be repaired. Many times, however, the user is away from the spare pair. For example, the user may be hiking, fishing or hunting in the woods-far away from a repair shop or home. Similarly, the user may be on a golf course, driving on a highway or otherwise engaged in some activity removed from access to a spare pair of glasses. Oftentimes the broken glasses become an additional problem in that the user must leave that area and return to either a repair shop or home to get the glasses fixed. Driving while wearing a broken pair of glasses is difficult at best, dangerous at worst.

BRIEF DESCRIPTION OF THE INVENTION

The instant invention overcomes this problem. It is a portable replacement for eyeglass nose pad ad or arm posts. The invention is a pair of tubes, made of flexible plastic tubing. The tubing can be padded for additional comfort. The padding can also be contoured to better fit against a user's nose. The tubing is designed to fit over the edges of the lenses where the posts were secured. Alternatively, the tubing can be used to cover the posts that remain after the nose pad is broken off. The tubes are friction fit over the lens or posts. Once the tubes are in place, the user may wear the eyeglasses until they can be brought to a repair shop. The tubes can be cut to any desired length as needed. Moreover, several diameters of tubing can be provided to ensure a proper fit on any given set of lenses or posts.

DETAILED DESCRIPTION OF THE INVENTION

Figure 1:
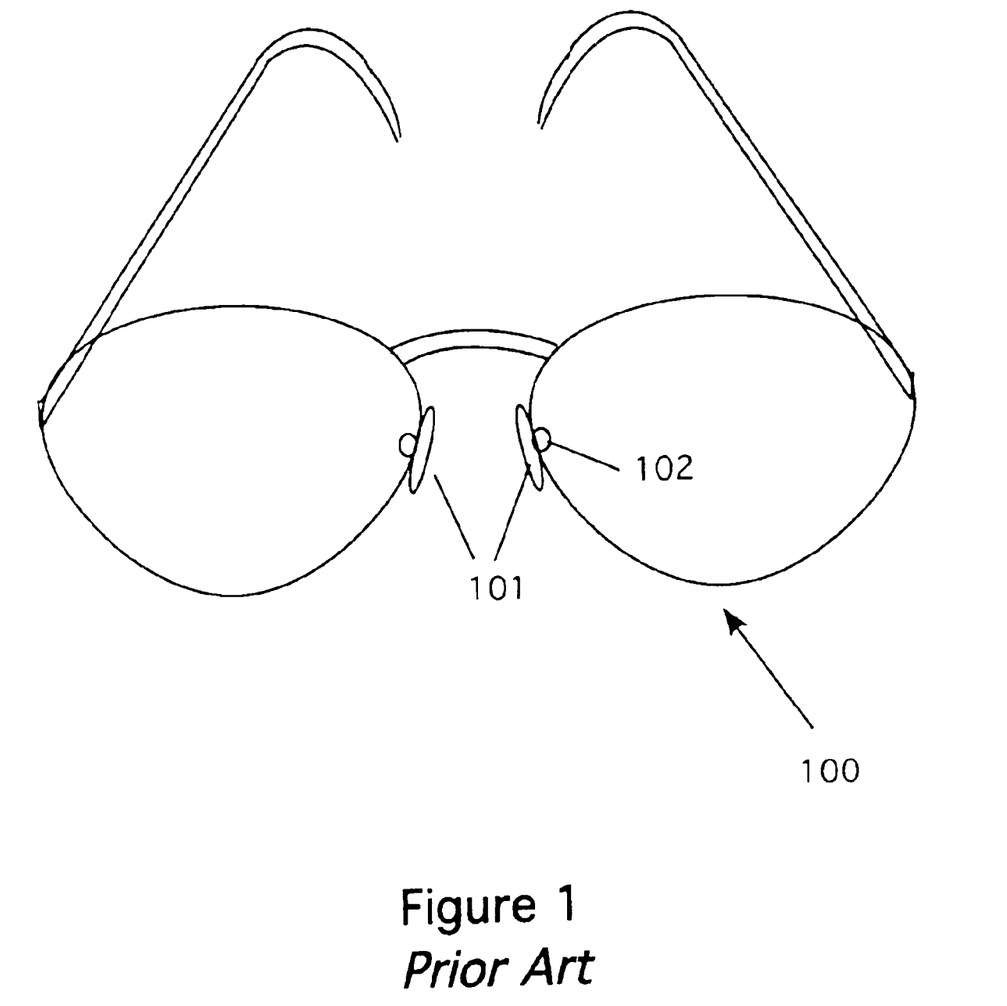
FIG. 1 is a perspective view of a pair of glasses as prior art.
Figure 2:
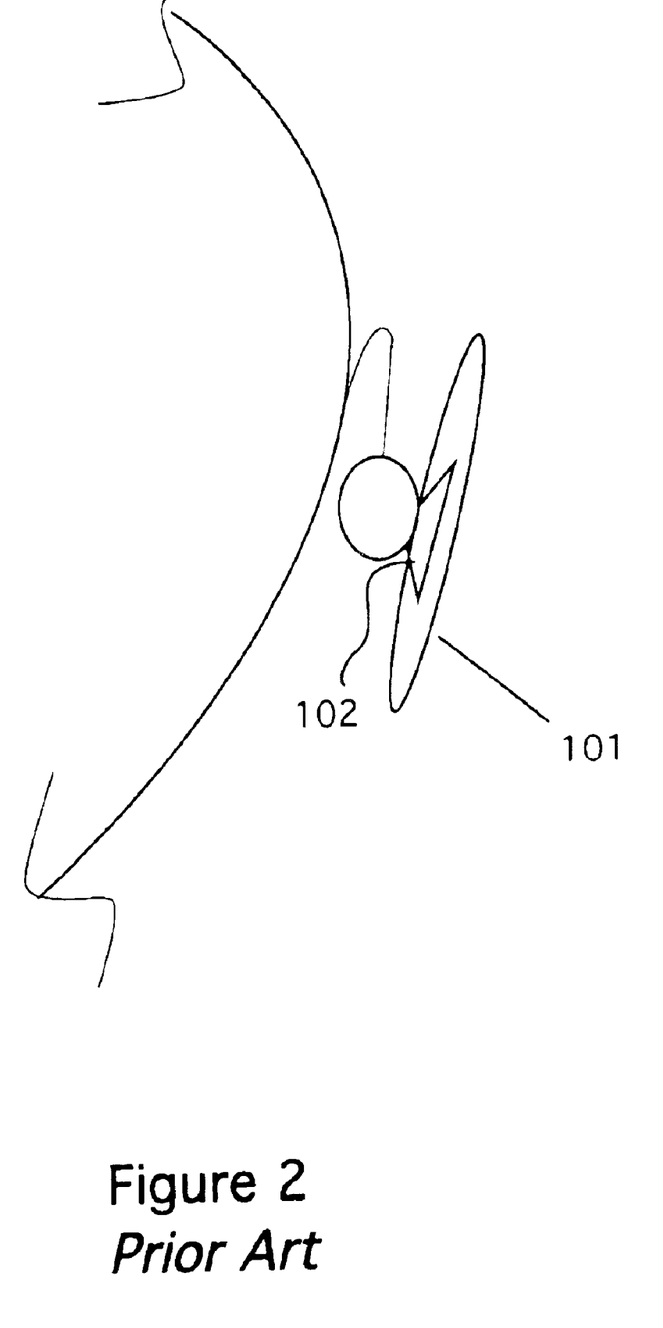
FIG. 2 is a detail view of one of the nose supports and a portion of a lens from the glasses as prior art.
Figure 3:
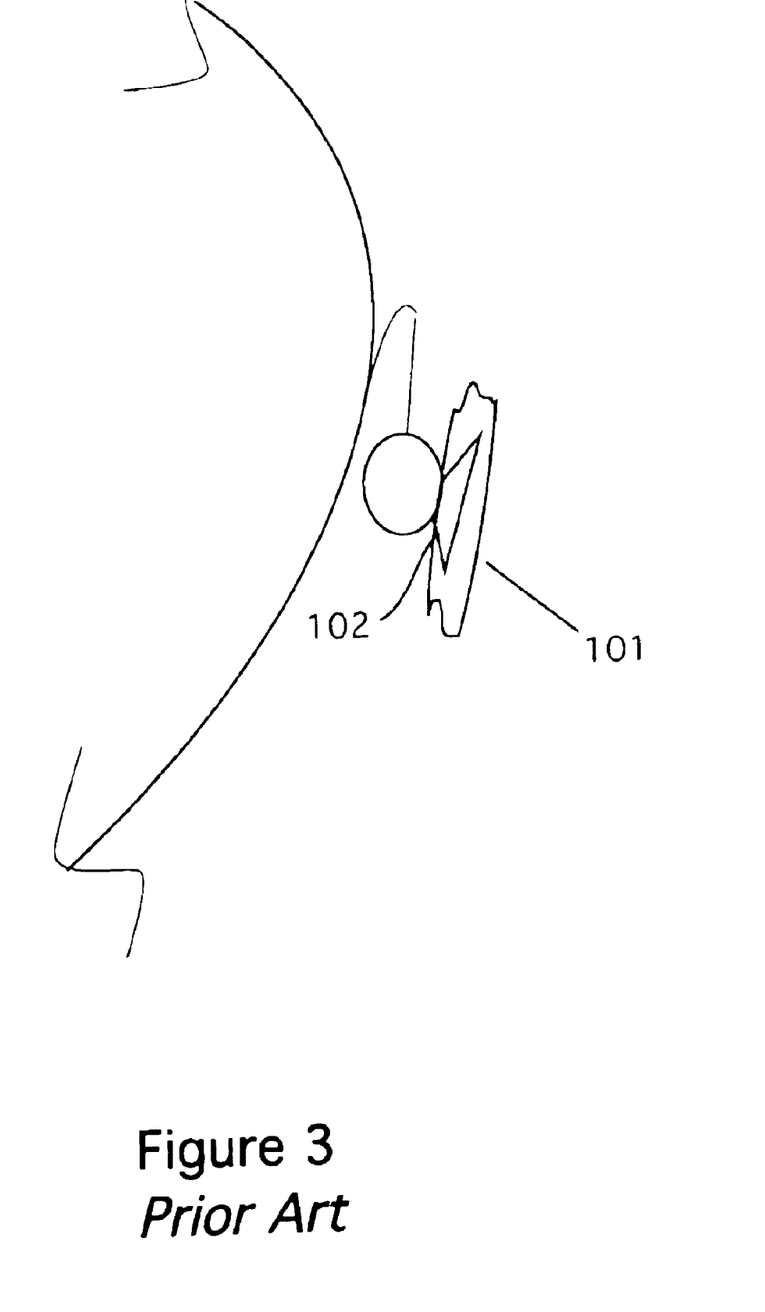
FIG. 3 is a detail view of one of the nose supports, shown broken, and a portion of a lens from the glasses as prior art.

Referring now to FIG. 1, a typical pair of eyeglasses 100 is shown as prior art. Modern eyeglasses that use the so called "no frame" or metal frame construction have pivoting nose pads 101 that are attached to metal posts 102, which are secured to the lenses 105b by a thin strip that is secured to the lens. See also, FIG. 2. These posts 102 vary in shape, but all effectively hold the nose pads 101 in place. While the posts 102 are made of metal, the nose pads 101 are typically made of a plastic material for comfort. Occasionally, these pads 101 break, as shown in FIG. 3. Note that the break shown in FIG. 3 is representative and does not reflect all possible forms of breakage. In some cases, the entire pad may separate from the post.

In any event, once the pad is damaged, it makes the glasses uncomfortable to wear at best and difficult or impossible to wear at worst. A person needing glasses must have some way of fixing the problem so that the user does not become incapacitated.

Figures 4, 5, 6:
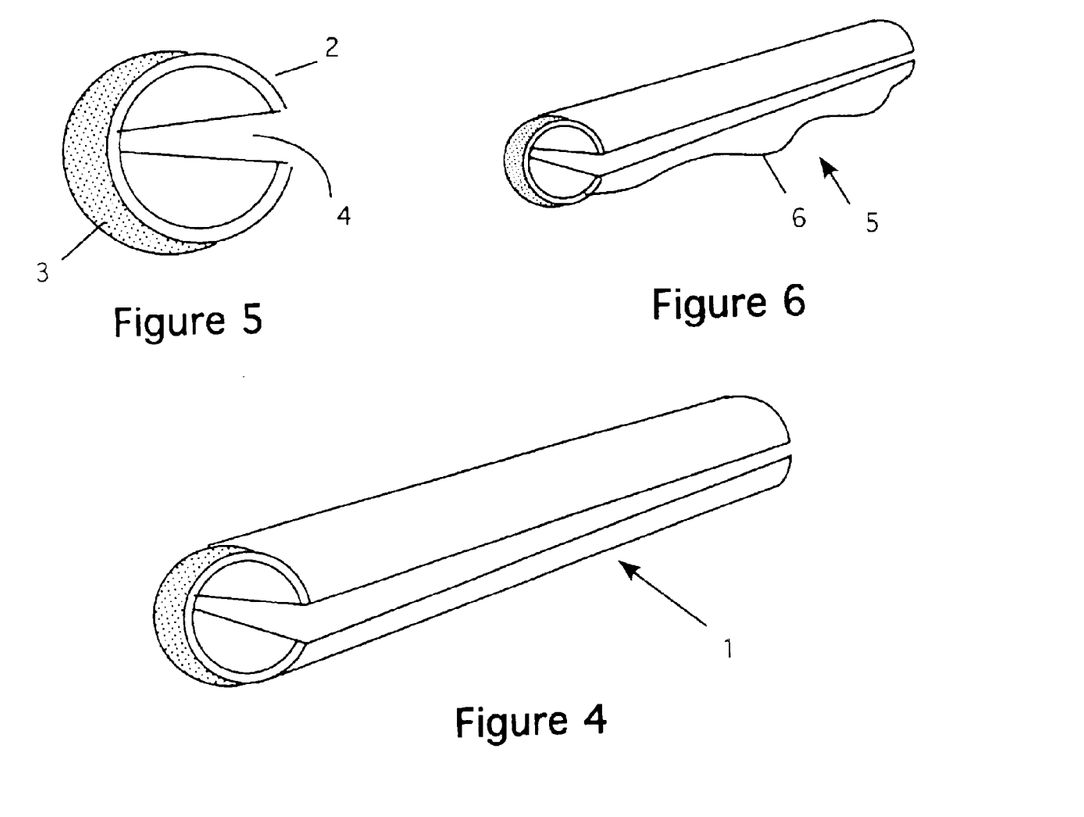
FIG. 4 is a perspective view of the first embodiment of the invention.
FIG. 5 is a front view of a first embodiment of the invention.
FIG. 6 is a perspective view of the second embodiment of the invention.

FIGS. 4 and 5 shows details of the invention 1, which is a tube. The tube 1 is flexible and soft. It can be made of a number of different materials. In the preferred embodiment, the material is a soft plastic core 2 that has a foam outer covering 3. The tube has a slit 4 cut down one side as shown. This allows the tube 1 to fit over a variety of nose pad posts. The tube can be attached to the right and left sides of the bridge. In one embodiment, the foam covering can be made to fit the user's nose by molding it to the user. In other embodiments, the foam cover can be preformed to act as a universal pad. Moreover, a repair kit can contain a number of different preformed tubes, to accommodate many different wearers.

Figure 7:
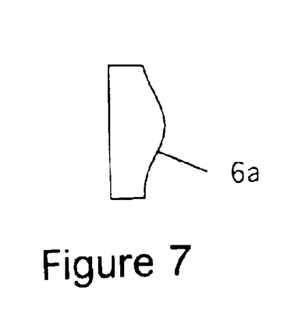
FIG. 7 is a sectional detail of a preformed nose pad profile taken along the lines 7—7 of FIG. 5.
Figure 8:
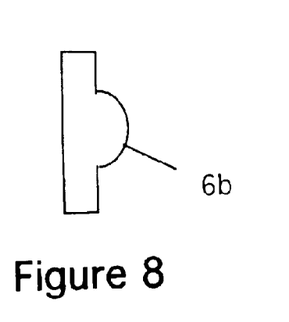
FIG. 8 is a sectional detail of a second preformed nose pad profile.
Figure 9:
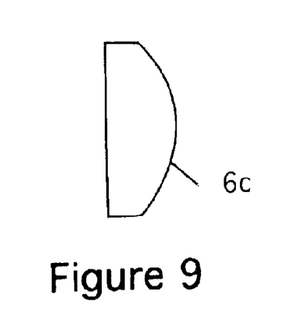
FIG. 9 is a sectional detail of a third preformed nose pad profile.

FIG. 6 is a perspective view of the second embodiment of the invention. In this embodiment, the foam outer covering 3 has a wavy shape on side as shown. This shape allows the tube to conform to the user for additional comfort. FIGS. 7, 8, and 9 are sectional detail views of three different preformed nose pad profiles of the foam outer covering 3. Of course, any other type of profile can be used as well.

Figure 10:
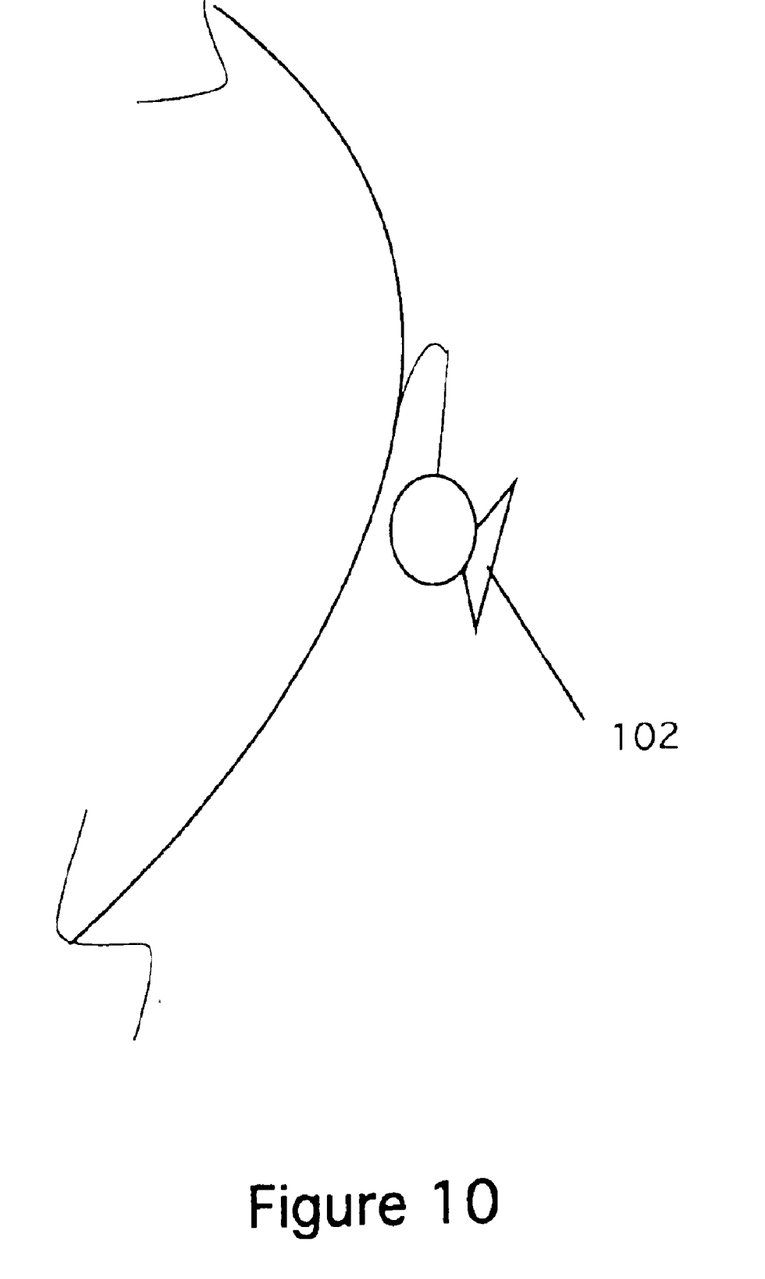
FIG. 10 is a detail view showing the broken nose support removed from the nose pad support post.
Figure 11:
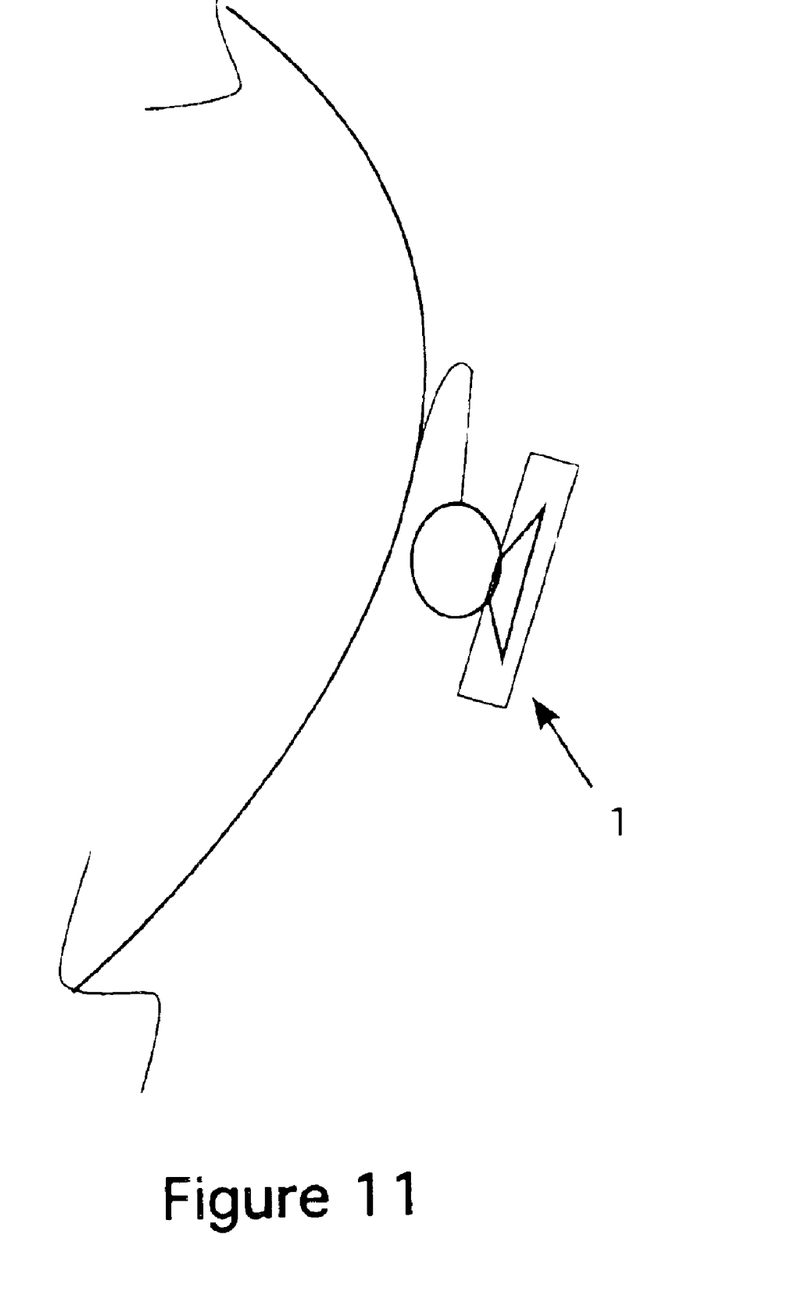
FIG. 11 a detail view of the nose pad support post with the invention installed.

To use the device, the pair of glasses must first be prepared. In one embodiment, the remaining portions of the nose pad 101 must be completely removed. This is shown in FIG. 10. Once the nose pads have been removed, the tubing 1 is cut to an appropriate length for the post 102 and the tube is fitted in place over the post. The replacement pad 1 is held in place by friction. FIG. 11 is a detail view of the nose pad support post with the invention installed.

Figure 12:
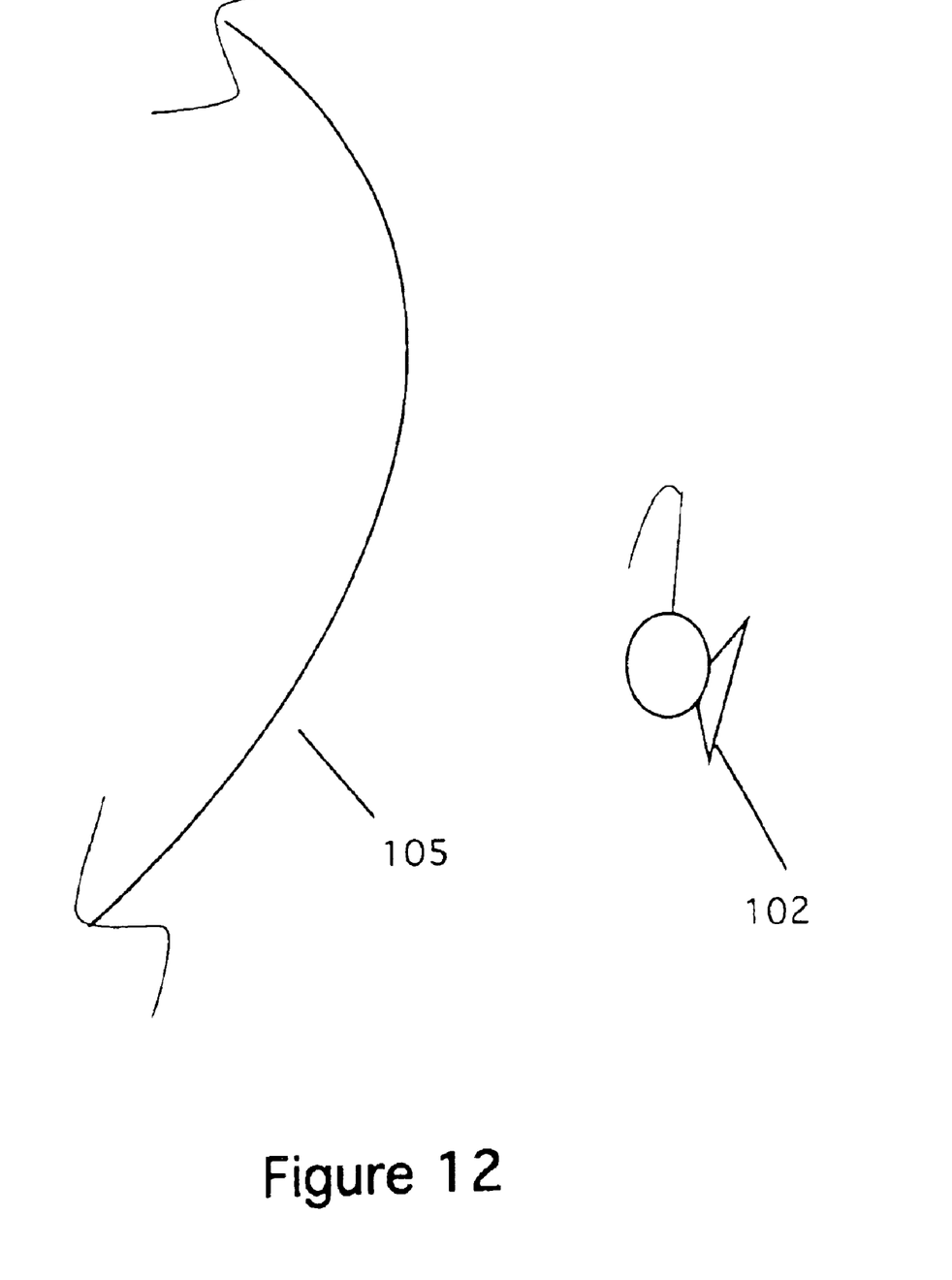
FIG. 12 is a detail view of a lens with the nose support completely broken off.
Figure 13:
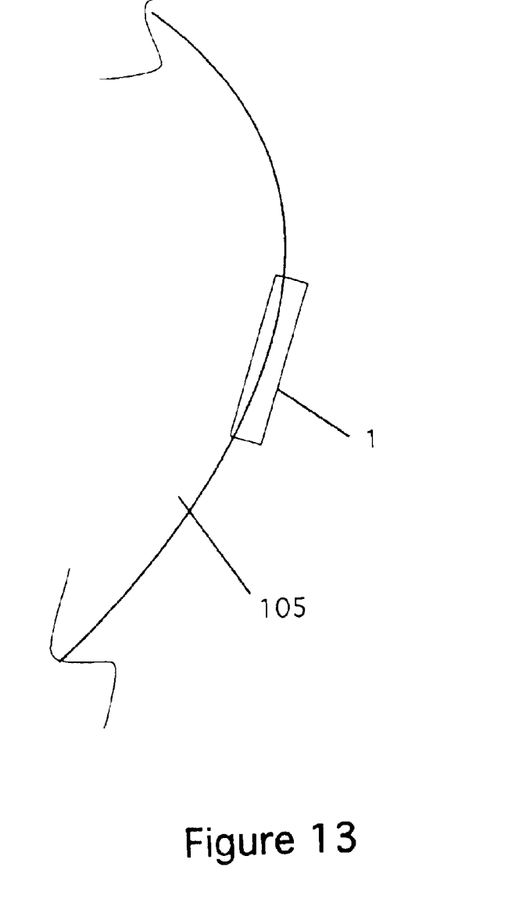
FIG. 13 is a detail view of the invention placed on the lens.
Figure 14:
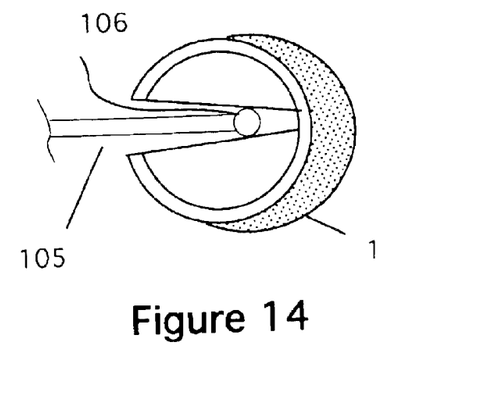
FIG. 14 is a cross-sectional view of the invention placed on a lens.

In the preferred repair embodiment, FIG. 12 shows a case where the entire nose pad post 102 has broken off from the lens 105. In some cases, the majority of the post may be broken leaving only a small piece remaining. In this case, the remaining piece is cut off the lens and discarded. Then, the pad 1 is slipped over the lens using the slit 4 that is formed in it. FIG. 14 is a cross section showing the lens 105 on the slit 4 of the invention 1. Note that this figure shows a piece of wire 106 in dashed line. This wire 106 represents the frame of the glasses if one is used. As shown, the sleeve fits over the edge of the lens where it can protect the user.

In this way, a user can quickly make a repair to the eyeglasses and continue to use them until the user can get to a proper repair facility. This not only permits the user continue safely, but comfortably as well.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A repair device for eyeglass nose pads comprising:
   a) a length of preformed tube of flexible material, said length of preformed tube having a slit formed longitudinally therein;
   b) wherein said length of preformed tube having an inside diameter sized to pit over a nose pad post on a pair of eyeglasses.

2. The repair device of claim 1 wherein the length of preformed tube of flexible material further comprises an inner core and a padded outer covering.

3. The repair device of claim 2 wherein the padded outer covering has a preformed shape.

4. The repair device of claim 2 wherein the padded outer covering is deformable when in contact with an object having a shape, such that said padded outer covering conforms to the shape of the object.

5. A method of repairing a pair of eyeglasses having a broken nose pad and nose pad support posts comprising the steps of:
   a) cutting a length of preformed tube of flexible material, said length of preformed tube having a slit formed longitudinally therein, to a length to fit the nose pad support post; and
   b) placing the length of preformed tube of flexible material onto said nose pad support post such that said length of preformed tube of flexible material is held on said nose pad support post by friction.

6. The method of claim 5 further comprising the step of removing the broken nose pad from the nose pad support post, prior to step a.

7. The method of claim 6 wherein further comprising the step of removing a second nose pad from a second nose pad support post.

8. The method of claim 7 wherein steps a and b are repeated for a second nose pad support post.

9. The method of claim 5 wherein steps a and b are repeated for a second nose pad support post.

10. The method of claim 5 wherein the length of preformed tube of flexible material further comprises an inner core and a padded outer covering.

11. The method of claim 10 wherein the padded outer covering has a preformed shape.

12. The method of claim 10 wherein the padded outer covering is deformable when in contact with an object having a shape, such that said padded outer covering conforms to the shape of the object.

13. A method of repairing a pair of eyeglasses having a, lens, a broken nose pad and nose pad support post, comprising the steps of:
   a) cutting a length of preformed tube of flexible material, said length of preformed tube having a slit formed longitudinally therein, to a length; and
   b) placing the length of preformed tube of flexible material onto the eyeglass lens such that said length of preformed tube of flexible material is held on said lens by friction.

14. The method of claim 13 further comprising the step of removing the broken nose pad support post from said lens, prior to step a.

15. The method of claim 13 wherein steps a and b are repeated for a second lens.

16. The method of claim 15 further comprising the step of removing the broken nose pad support post from the second lens, prior to step a.

* * * * *